US012452281B2

(12) United States Patent
Ramakrishnan et al.

(10) Patent No.: US 12,452,281 B2
(45) Date of Patent: Oct. 21, 2025

(54) AUTOMATED CONTAINER SECURITY

(71) Applicant: Dell Products L.P., Round Rock, TX (US)

(72) Inventors: Thiagarajan Ramakrishnan, Round Rock, TX (US); Shamik Kacker, Austin, TX (US); Leandro Lopes, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 146 days.

(21) Appl. No.: 18/055,900

(22) Filed: Nov. 16, 2022

(65) Prior Publication Data

US 2024/0163306 A1    May 16, 2024

(51) Int. Cl.
H04L 9/40    (2022.01)

(52) U.S. Cl.
CPC ...... H04L 63/1433 (2013.01); H04L 63/1441 (2013.01)

(58) Field of Classification Search
CPC ............... H04L 63/1433; H04L 63/1441
See application file for complete search history.

(56) References Cited

U.S. PATENT DOCUMENTS

| | | | | |
|---|---|---|---|---|
| 11,070,582 B1* | 7/2021 | Berger | ............... | H04L 63/1433 |
| 11,122,073 B1* | 9/2021 | Cai | ............... | G06Q 10/0635 |
| 11,895,101 B2 | 2/2024 | Montemayor et al. | | |
| 2018/0109387 A1* | 4/2018 | Vyas | ............... | G06F 8/71 |
| 2019/0354690 A1* | 11/2019 | Brigandi | ............... | H04W 12/126 |
| 2020/0252423 A1* | 8/2020 | Hogg | ............... | G06Q 10/0635 |
| 2020/0265134 A1* | 8/2020 | Cristina | ............... | G06F 8/60 |
| 2021/0099478 A1* | 4/2021 | Seetharamaiah | ....... | H04L 63/14 |
| 2021/0329022 A1* | 10/2021 | Chhetri | ............... | H04L 67/561 |
| 2021/0352104 A1* | 11/2021 | Sampat | ............... | H04L 63/0236 |
| 2021/0367966 A1* | 11/2021 | Yanay | ............... | G06N 20/00 |
| 2022/0200869 A1* | 6/2022 | Erlingsson | ............... | H04L 67/10 |
| 2022/0329616 A1* | 10/2022 | O'Hearn | ............... | G06F 9/545 |
| 2024/0168855 A1 | 5/2024 | Lopes et al. | | |

OTHER PUBLICATIONS

National Research Council, et al. "Frontiers in Massive Data Analysis" [https://nap.nationalacademies.org/catalog/18374/frontiers-in-massive-data-analysis], 2013, 191 pages.
"What Is Kubernetes Container Security?" TrendMicro. [https://www.trendmicro.com/en_us/what-is/container-security/kubernetes.html], retrieved Aug. 28, 2025, 5 pages.

(Continued)

Primary Examiner — Rupal Dharia
Assistant Examiner — Raghavender Cholleti
(74) Attorney, Agent, or Firm — Amin, Turocy & Watson, LLP

(57) ABSTRACT

Architectures and techniques are described that can automate container security elements in the context of applications being deployed on a container orchestration platform. Techniques detailed herein can serve to increase awareness of container product security in an automated manner, can automate processes on detecting security vulnerabilities and bringing down insecure workspaces, can automate processes for mitigating the security vulnerabilities, notifying, verifying, and bringing the associated containers back online.

20 Claims, 11 Drawing Sheets

(56) References Cited

OTHER PUBLICATIONS

Lakshminarayan et al., "Enterprise-wide Machine Learning using Teradata Vantage: An Integrated Analytics Platform" 2019 IEEE International Conference on Big Data (Big Data), Dec. 2019, 4 pages.

Moradi, et al. "Reproducible Model Sharing for AI Practitioners" [https://dl.acm.org/doi/pdf/10.1145/3493652.3505630], DIDL '21, Dec. 6, 2021, Virtual Event, Canada, 6 pages.

"DevOps Terminology: A Glossary" Plutora. [https://www.plutora.com/devops-at-scale/terminology-glossary], retrieved Sep. 26, 2022, 12 pages.

Mehrotra, et al. "Supporting "Big Data" Analysis and Analytics at the NASA Advanced Supercomputing (NAS) Facility" NAS Technical Report: NAS-2014-02, Jan. 29, 2014, 19 pages.

Sculley, et al. "Hidden Technical Debt in Machine Learning Systems" Advances in Neural Information Processing Systems 28, 2015, 9 pages.

"secureIT-project / CVEfixes" GitHub. [https://github.com/secureIT-project/CVEfixes], retrieved Aug. 28, 2025, 4 pages.

Osnat, Rani. "Kubernetes Security Basics and 10 Essential Best Practices" AquaSec. [https://www.aquasec.com/cloud-native-academy/kubernetes-in-production/kubernetes-security-best-practices-10-steps-to-securing-k8s/], Dec. 23, 2020, 14 pages.

"Our Partners for your ICT-Security, Network & Cloud environments" Infoguard. [https://www.infoguard.ch/en/partners/twistlock-container-security] retrieved Aug. 28, 2025, 47 pages.

"Twistlock: Prisma Cloud Container Security Overview and Analysis" eSecurityPlanet. [https://www.esecurityplanet.com/products/twistlock/] retrieved Aug. 28, 2025, 10 pages.

"CVE-2020-27153" debian. [https://security-tracker.debian.org/tracker/CVE-2020-27153] retrieved Aug. 28, 2025, 1 page.

* cited by examiner

AUTOMATED CONTAINER SECURITY

BACKGROUND

Containerization is a lightweight virtualization technique that provides high consistency, operating systems distribution portability, efficient resource management, and consistency across multiple environments. Thus, applications or application programming interfaces (APIs) can be containerized to provide wide numerous benefits to service providers and their subscribers. Due to the many benefits of containerization, many products have entered the market place to help automate and orchestrate containerization. One such example product is Kubernetes. Kubernetes is an open-sourced software tool that can effectively manage containerized applications with minimal manual intervention. To keep Kubernetes workloads safe, especially in a production environment, there are various architectural vulnerabilities and platform dependencies necessary to be in-place to get maximum value out of applications. Data analysis reveals that it becomes more challenging when data frequently changes (potentially radically) over time and workflow needs to be updated consistently to have a secure infrastructure. With containers, application workloads can be less cumbersome compared to customizing, sharing, maintaining and securing real-world systems.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
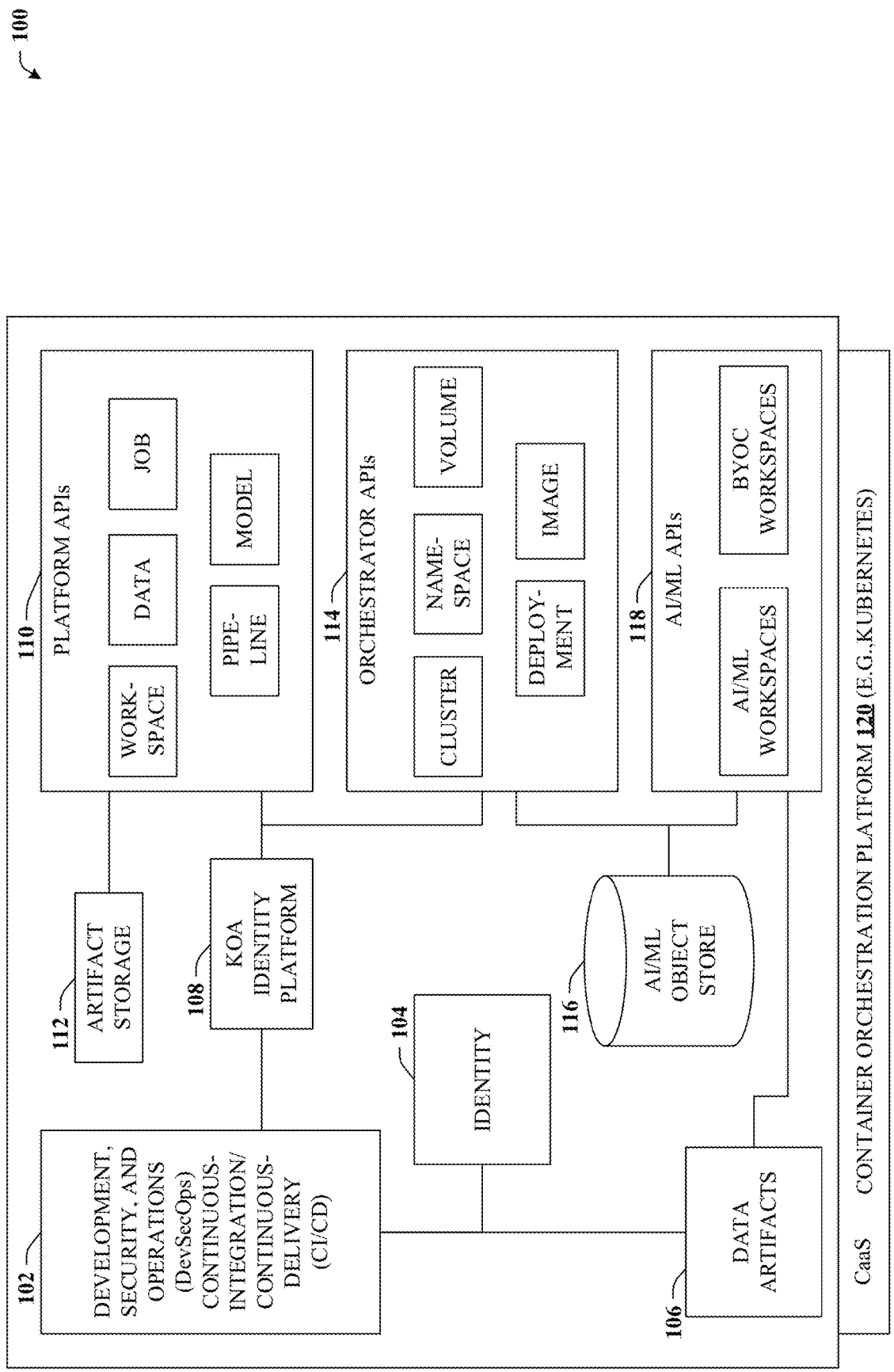
FIG. 1 depicts a schematic block diagram 100 of an example architecture for deploying AI/ML applications as containers on top of a container orchestration platform in accordance with certain embodiments of this disclosure.

Recent analysis of the industry reveals that while 86% of organizations manage some portion of their workloads on containerized application management platforms such as Kubernetes, security still remains a large concern. Especially while running mission critical application workloads on company clusters. Without a strategy in place, such can cause major delays in workflows or services in containerized application management platforms due to serious security incidents. Beyond offering basic security features in containerized application management platforms (e.g., Kubernetes) using policies like role-based access control (RBAC), service accounts, secrets, and so forth, the ability to protect containerized applications from vulnerabilities is largely lacking. This is currently the case, even though many network services are being managed on container orchestration platforms.

The present application relates generally to the field of container security and, more particularly, automating security for containerized applications. While substantially any type of application or API can be containerized, artificial intelligence (AI)/machine learning (ML) applications represent a useful example. Hence, while the disclosed subject matter can apply to any type of suitable application run on any suitable container orchestration platform, containerized AI/ML applications running on Kubernetes is used herein as representative examples.

Rapid advancement in AI and ML from both industry and academia is leading to a demand for large-scale, efficient, secure, and safe model deployment and sharing. With Kubernetes being one of the de facto standards for deploying and serving models as containers, it may be important for organizations to better secure their AI/ML infrastructure. It is often noted in the industry that among the many problems posed by AI/ML platforms/vendors, some of the crucial challenges are the following.

One challenge is that a majority of AI/ML applications deployed as containers in company infrastructure should adhere to the organization's security standards. Certain organizations may have 50,000+ containers running on company infrastructure with hundreds of thousand container security vulnerabilities in those systems.

As mentioned, Kubernetes is one example of a containerized application management platform. In this regard, Kubernetes does not manage security efficiently. Even though 85%+ organizations manage some portion of their workloads in Kubernetes, security still remains a big concern. Most of the respondents to relevant surveys suggested that there has been inadequate investment in container security.

It is a time consuming and a resource intensive process to understand the critical and high vulnerabilities that are present in the infrastructure, and fixing those applications with security patches, is considered even more challenging.

Apart from a container having vulnerabilities, the applications also have to be compliant with various cyber-security standards within the application infrastructures (e.g., either on-premises or public cloud solutions).

In a nutshell, while deploying AI/ML applications (or any suitable applications) on top of containerized application management infrastructures (e.g., Kubernetes, or any other container service, deployment infrastructure or orchestration infrastructure), prevention should consider the threats of compromising images and image registries, compromising containers and malicious traffic into those containers, visibility about vulnerabilities of containers, insecure configurations, compliance challenges, and other potential issues.

To date, detecting potential security risks is a manually intensive process and generally relies on both technical skills and domain skills for mapping information. Certain default security tools can provide visual maps of data, which can be useful, but these tools do not paint the whole picture, given the various threats and complexities that may be introduced while deploying 100k+ containers in a production environment. Additionally, automating the whole process, while a useful task, can be a challenging task.

For example, to do so, data scientists decide on what is the best possible approach to fetch data, build models and run inferences on top of the pre-built model. To do this effectively, these data scientists may rely on expertise in many different fields such as expertise in containers, Kubernetes (or other container orchestration platforms), data security, endpoints, scaling, persistent volumes, Graphical Processing Units (GPUs), development and operations (DevOps), programming in many, sometimes new, languages, many different tools, and so on.

Application security is assumed for all AI/ML containers deployed on cloud-native infrastructures like Kubernetes. Open-source products are constantly delivering new changes and it becomes incredibly hard to update and maintain those package versions periodically. The fix for all the high, critical, medium and low vulnerabilities also is challenging as the number of containers, and the clusters to manage, increases.

Tools exist to identify certain vulnerabilities, and it is not uncommon for these tools to indicate that a single AI/ML container (such as Airflow, which is deployed on Kubernetes) can have numerous vulnerabilities, several of them even critical or high risk. The potential of being victim to a malicious attack or receiving malicious data on enterprise infrastructure grows exponentially with the number of containers on a given system.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In order to better describe the disclosed subject matter, it can be instructive to consider an architecture of containerized applications running on a container orchestration platform, such as, but not limited to Kubernetes, an example of which can be found at FIG. 1.

With reference now to FIG. 1, a schematic block diagram 100 of an example architecture for deploying AI/ML applications as containers on top of a container orchestration platform in accordance with certain embodiments of this disclosure. For example, development, security, and operations (DevSecOps) module 102 can provide development, security, and operations elements. Techniques relating to continuous-integration (CI) and/or continuous delivery (CD) can be employed.

DevSecOps module 102, an example of which can be Gitlab, can communicate with identity module 104, an example of which can be Vault; data artifacts module 106, which can be an image repository; and Koa identity platform 108, which ultimately communicate with platform APIs 110, orchestrator APIs 114, and the other deployed APIs, which in this case are AI/ML APIs 118.

It is noted that platform APIs 110 can communicate with artifact storage 112, and orchestrator APIs 114 or AI/ML APIs 118 can communicate with AI/ML object store 116. The various APIs (e.g., platform APIs 110, orchestrator APIs 114, and AI/ML APIs 118) can be containerized and run on top of container orchestration platform 120. In some embodiments, container orchestration platform 120 can provide containers-as-a-service (CaaS).

Typical sets of platform APIs 110 and orchestrator APIs 114 can be deployed on top of container orchestration platform 120. Additionally, certain AI/ML APIs 118 can be deployed as well, examples of which can include: an application or API for persisting the data in a cluster of the container orchestration platform 120 (e.g., persistent volume claim (PVC)), deployment for hosting the application, service for accessing the application internally within the cluster, ingress for allowing external traffic to access the AI/ML AIPs 118.

Vulnerabilities can be reported for any application that is running on top of the cluster, as this contains the logic to perform a particular business action. As illustrated, container images can be securely fetched from a registry (e.g., Harbor) and deployed via CI/CD solutions via DevSecOps module 102. The environment variables utilized to deploy these applications can be fetched from identify module 104 during runtime. In the case that there is any open-source packages that are leveraged for running certain AI/ML workloads, such can be fetched from artifact storage 112 or another source. The vulnerability distribution before and after deploying these images can be fetched from container security elements.

One issue that arises with this architecture is a lack of knowledge of vulnerabilities in these containers. For many developers, application security is assumed for any application deployed on cloud-native infrastructures, but in reality such is not the case. Furthermore, when new packages, new software or libraries are added to AI/ML containers, additional sets of high, medium, and critical vulnerabilities get introduced. Fixing these vulnerabilities before such breach a service level agreement (SLA) or the like is a challenging task. Open-source products as well as proprietary products are constantly delivering new changes. It is extremely challenging to update and maintain those package versions over time.

Another issue that arises is that a slower development process for testing simple customer use cases and fixing these vulnerabilities promptly becomes difficult. Data scientists must be an expert in various cloud technologies, DevOps, Machine Learning pipelines, frameworks, and security for these frameworks to fully address these issues.

Still another challenge that arises is the probability of malicious data/attack on enterprise infrastructure increases as the number of AI/ML containers that are deployed increases. Attempting to address security challenges manually is a daunting task and requires knowledge of security standards to provide safe and reliable customer experience. There exists a silo in providing an end-to-end solution/security framework for this issue.

Figure 2:
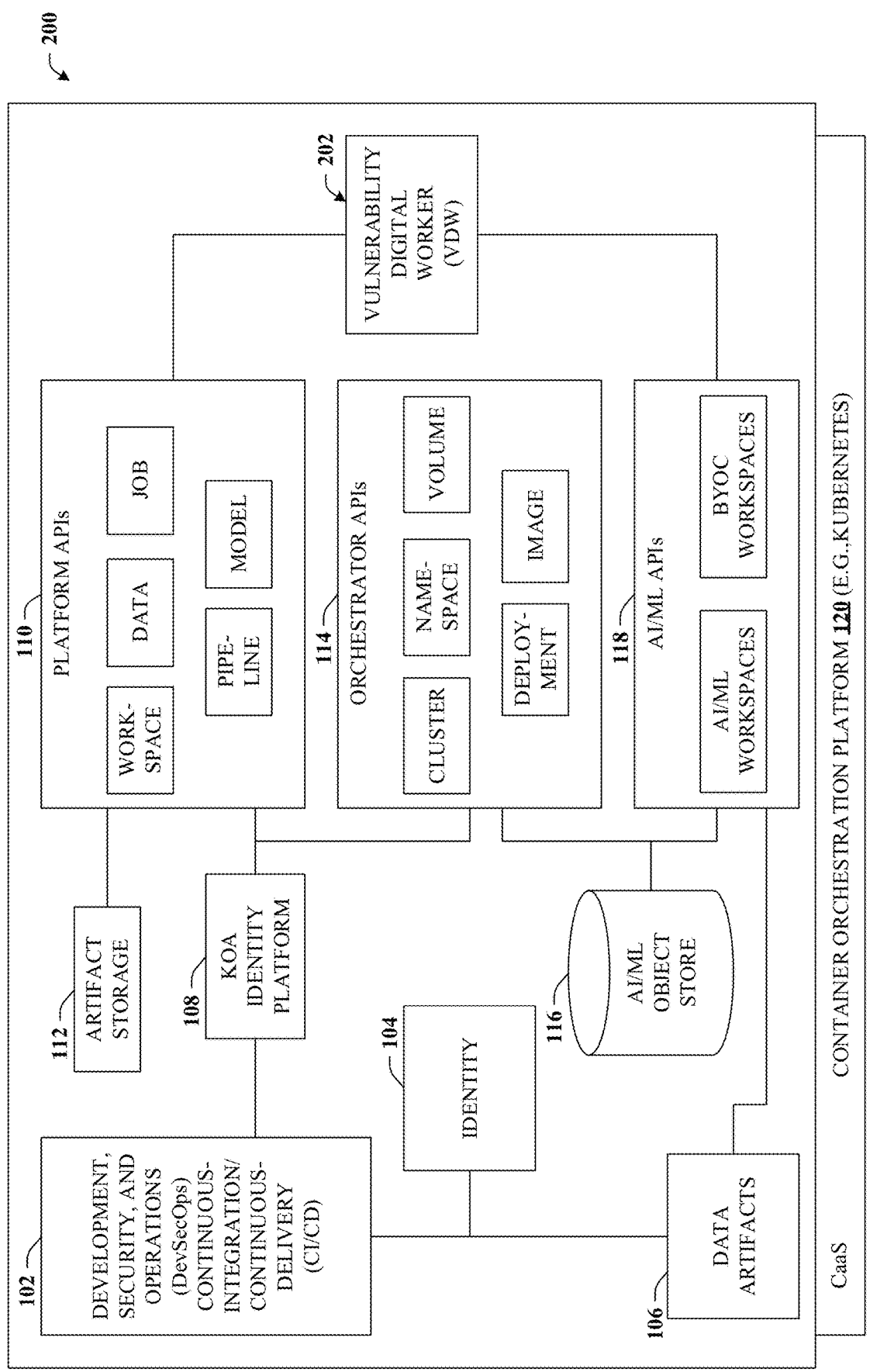
FIG. 2 depicts a schematic block diagram 200 of an example architecture for deploying AI/ML applications as containers on top of a container orchestration platform with a VDW that provides automated security elements in accordance with certain embodiments of this disclosure.

To address these and other challenges, the disclosed subject matter describes a vulnerability digital worker (VDW) framework, illustrated in connection with FIG. 2. FIG. 2 illustrates a similar example architecture as FIG. 1, along with the addition of a VDW to provide automated security elements.

Turning now to FIG. 2, presented is a schematic block diagram 200 of an example architecture for deploying AI/ML applications as containers on top of a container orchestration platform with a VDW that provides automated security elements in accordance with certain embodiments of this disclosure. As noted, elements detailed in diagram 200 are substantially similar to those of diagram 100, with the addition of VDW 202. VDW 202 can provide an advanced automated information security framework for any container-based systems or workloads (e.g., such as AI/ML systems or workloads), including a container image, the running container, and everything in between.

Having a vulnerability management plan integrated within the entire machine learning development lifecycle can simplify the identification and resolution of any security concerns before it becomes a serious threat for any organization. As will be further detailed herein, VDW 202 can enhance the overall security of AI/ML containers on demand, for example, by creating awareness for users on their vulnerability distribution, deploying mechanisms (potentially automated) to fix the vulnerabilities for the containers, and mitigating (potentially automatically) those vulnerabilities before an SLA is breached.

Platform APIs 110 and Orchestrator APIs 114 can be leveraged to deploy any AI/ML APIs 118 (e.g., AI/Ml workspaces) on top of container orchestration platform 120 clusters. These operations can also be leveraged by using open-source helm charts or docker images on top of the existing environment. Credentials required to securely access various components of the infrastructure can be stored in a Key-Value store such as identity module 104 (e.g., Vault). The images required for provisioning workspaces, images, pipelines, and so forth can be stored in a registry service like Harbor. Every interaction between components in shared APIs can also be secured using KOA identity platform 108.

With best CI/CD practices enforced while deploying and delivering feature improvements for each module, the core components of apart from Platform APIs 110, Orchestrator APIs 114, and AI/ML APIs 118 is Vulnerability Digital Worker (VDW) 202.

In more detail, platform APIs 110 can handle requests sent by a data practitioner. These requests can be routed via the Platform API 110 in the enterprise infrastructure, which can classify the request type sent by the user and store associated metadata relied upon by other elements or modules.

With regard to orchestrator APIs 114, based on the request received from Platform APIs 110, Orchestrator APIs 114 can interact with a server of the container orchestration platform 120 cluster directly. Such can fulfills the specification of creating workspaces, accessing services or frameworks within the infrastructure or launches jobs using CPUs or GPUs. A set of Orchestrator controllers can execute the containers needed to complete the pipeline specified by the user.

Regarding VDW 202, this module can inspect the vulnerability distribution of all the deployed containers and add labels to every deployed application with high, critical vulnerabilities, alongside the last time when the report was run at. For instance, VDW 202 can fetch vulnerabilities for each container, map containers with common vulnerabilities and exposures (CVE) tags, send notification (e.g., emails) and bring down the container, fix those vulnerabilities with CVE tags, and bring back online the secure container.

Accordingly, one or more example embodiments described herein can tremendously improve the overall security of enterprise infrastructure. These techniques can also provide mechanisms to customize the threshold values on how many high, critical, medium, or low vulnerabilities can be tolerated in an environment, and further can ensure compliance with company or enterprise security standards, making it easier and elegant to maintain. Another major advantage of this approach is that it can be reused for any cloud native architectural frameworks, operating on top of Kubernetes or any other suitable container orchestration platform 120.

Hence, VDW 202 can improve awareness about vulnerability distribution for AI/ML containers or any other custom containers that are deployed on top of an end-user's cloud native infrastructure. VDW 202 can also introduce automation. Such automation can relate to sending out frequent notifications and fixes or solutions for improving security for containers.

In some cases, such automation can guarantee end-to-end automation right from the discovery of vulnerability phase to, patching and deployment of upgraded images, which reinforces the security of an enterprise stack. Chances of attack drop significantly as all applications that cross a given security threshold are automatically brought down from the infrastructure.

VDW 202 can also provide the functionality to map the fix from the CVE Database, and patch all the fixes in the container and then bring the instance back up, e.g., after it passes the compliance threshold. Such a process can be implemented or scheduled on a periodic basis, or be event-drive such as when open-source software libraries or packages rolls out changes that increase the surface area of attack for malicious actors.

EXAMPLE SYSTEMS

Figure 3:
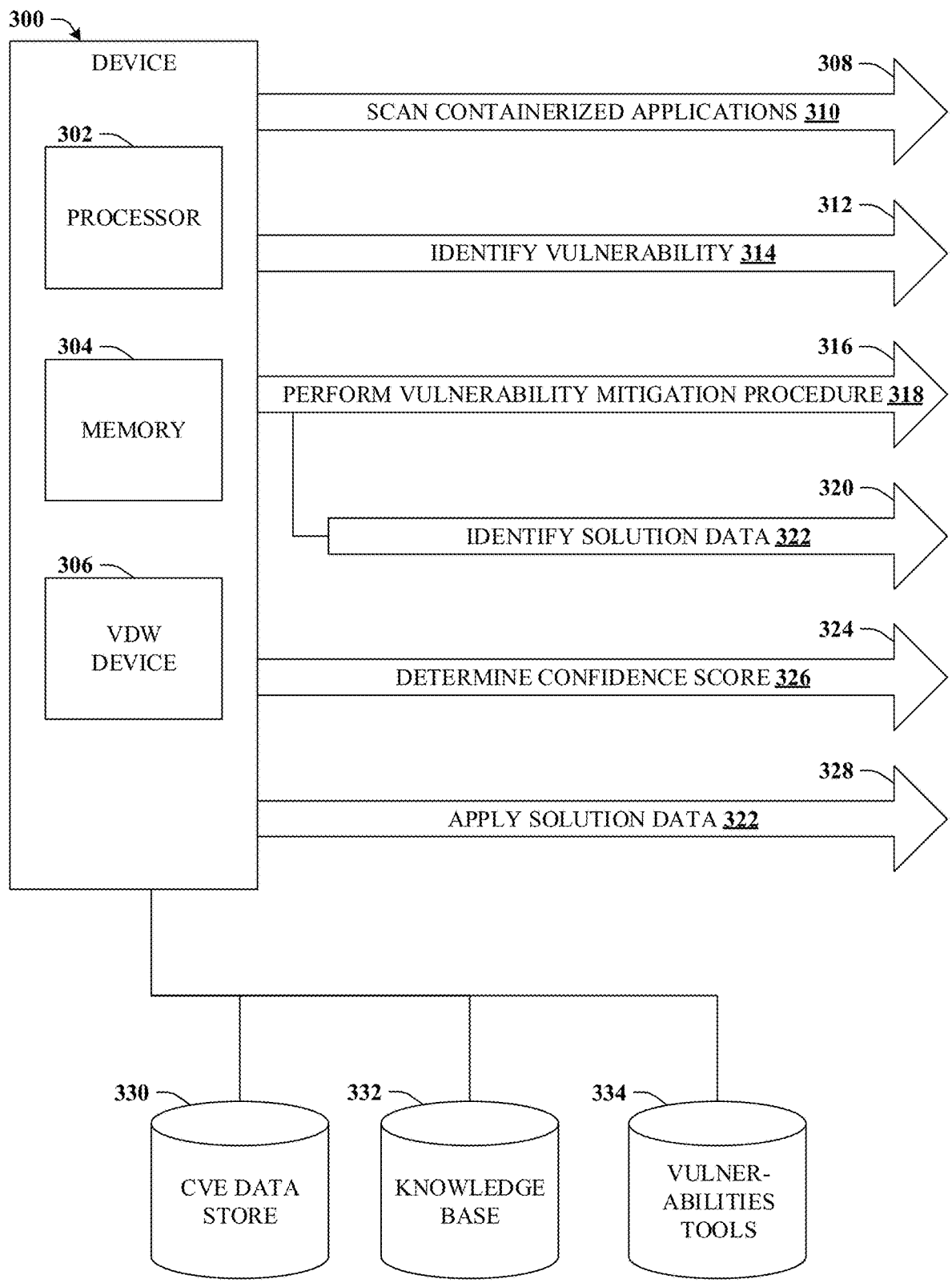
FIG. 3 depicts a schematic block diagram illustrating an example device 300 that can automate various elements of container security in accordance with certain embodiments of this disclosure.

Referring now to FIG. 3, a schematic block diagram is depicted illustrating an example device 300 that can automate various elements of container security in accordance with certain embodiments of this disclosure. For example, device 300 can represent all or a portion of VDW 202 or can comprise VDW 202, which can implemented as VDW device 306. Device 300 can comprise a processor 302 that can be specifically configured to automate various elements of container security. Device 300 can also comprise memory 304 that stores executable instructions that, when executed by processor 302, can facilitate performance of operations. Processor 302 can be a hardware processor having structural elements known to exist in connection with processing units or circuits, with various operations of processor 302 being represented by functional elements shown in the drawings herein that can require special-purpose instructions, for example, stored in memory 304 and/or VDW device 306. Along with these special-purpose instructions, processor 302 and/or device 300 can be a special-purpose device. Further examples of the memory 304 and processor 302 can be found with reference to FIG. 11. It is to be appreciated that device 300 or computer 1102 can represent a server device of a communications network or a user equipment device and can be used in connection with implementing one or more of the systems, devices, or components shown and described in connection with FIG. 3 and other figures disclosed herein.

At reference numeral 308, device 300 can scan containerized applications 310 deployed on a container orchestration platform such as that described in connection with container orchestration platform 120 of FIGS. 1 and 2. The containerized applications 310 can be any suitable application or API such as those detailed in connection with platform APIs 110, Orchestrator APIs 114, or AI/ML APIs 118 discussed with reference to FIGS. 1 and 2. It is again noted that these applications or APIs can be any suitable type and are not limited to AI/ML applications, although such provides a suitable representative example.

In response to scanning 308, device 300 can, at reference numeral 312, identify vulnerability 314 of a containerized application of the containerized applications that were processed during scanning 308.

Potentially in response to the identifying 312, device 300 can perform vulnerability mitigation procedure 318, which is illustrated by reference numeral 316. As indicated by reference numeral 320, vulnerability mitigation procedure 318 can comprise identifying solution data 322. Solution data 322 can be identified based on a source or location of vulnerability 314, which is further detailed in connection with FIG. 7. Solution data 322 can be indicated to mitigate vulnerability 314 of the associated containerized application. By way of example, FIG. 4 depicts several non-limiting examples of solution data 322.

Figure 4:
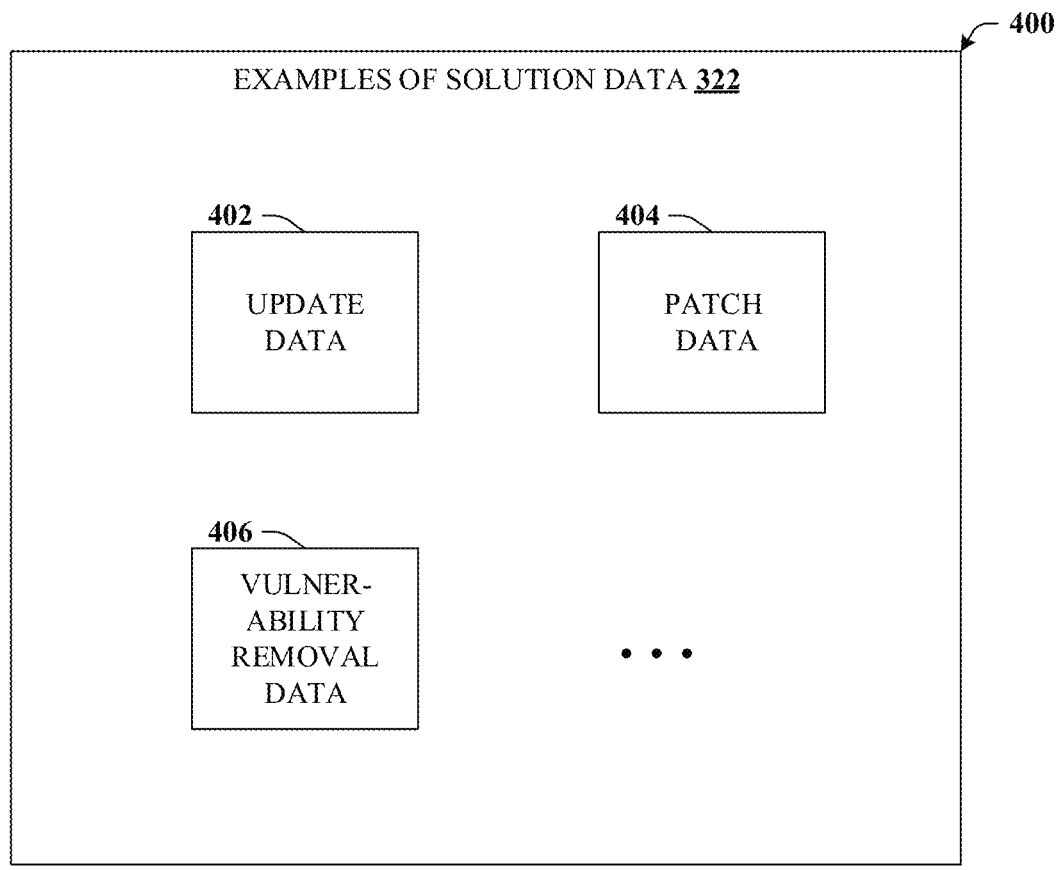
FIG. 4 illustrates block diagram 400 depicting various examples of solution data 322 in accordance with certain embodiments of this disclosure.

While still referring to FIG. 3, but turning now as well to FIG. 4, block diagram 400 is presented. Block diagram 400 depicts various examples of solution data 322 in accordance with certain embodiments of this disclosure. For example, in some embodiments, solution data 322 can be update data 402. Update data 402 can be data that, when applied, updates the containerized application (e.g., from among containerized applications 310) to which update data 402 is applied. In some embodiments, solution data 322 can be patch data 404. Patch data 404 can be data that, when applied, patches the containerized application to which patch data 404 is applied. In some embodiments, solution data 322 can be vulnerability removal data 406. Vulnerability removal data 406 can be data that, when applied, removes a dependency of the containerized application. Other examples of solution data 322 can exist including any data that, when applied to an associated containerized application, mitigates vulnerability 314.

Still referencing FIG. 3, with specific reference to reference numeral 324, device 300 can determine confidence score 326. Confidence score 326 can be indicative of a likelihood that the containerized application will function nominally after application of solution data 322. In other words, confidence score 326 can indicate a determined probability that the containerized application will function as intended after addressing vulnerability 314. In some embodiments, if confidence score 326 is sufficiently high (e.g., above a defined threshold), then, at reference numeral 328, device 300 can apply solution data 322 to the containerized application.

As noted, identification of vulnerability 314 and solution data 322, as well as application of solution data can be automated. In some embodiments, vulnerability 314 can be identified by application of a third-party tool or some other tool, which can be accessed via vulnerabilities tools 334. In some embodiments, solution data 322 can be identified in response to comparing vulnerability 314 to a common vulnerabilities and exposures data store 330.

Other information can be accessed via knowledge base 332. For example, in some embodiments, confidence score 326 can be determined as a function of a history of success regarding previous application of solution data 322, for instance, to other containerized applications having the same or similar vulnerability 314. Knowledge base 332 can store information relating to successful (or unsuccessful) vulnerability mitigation. Hence, confidence score 326 can be determined based on historical success rates or the like that can be accessed via knowledge base 332.

Figure 5:
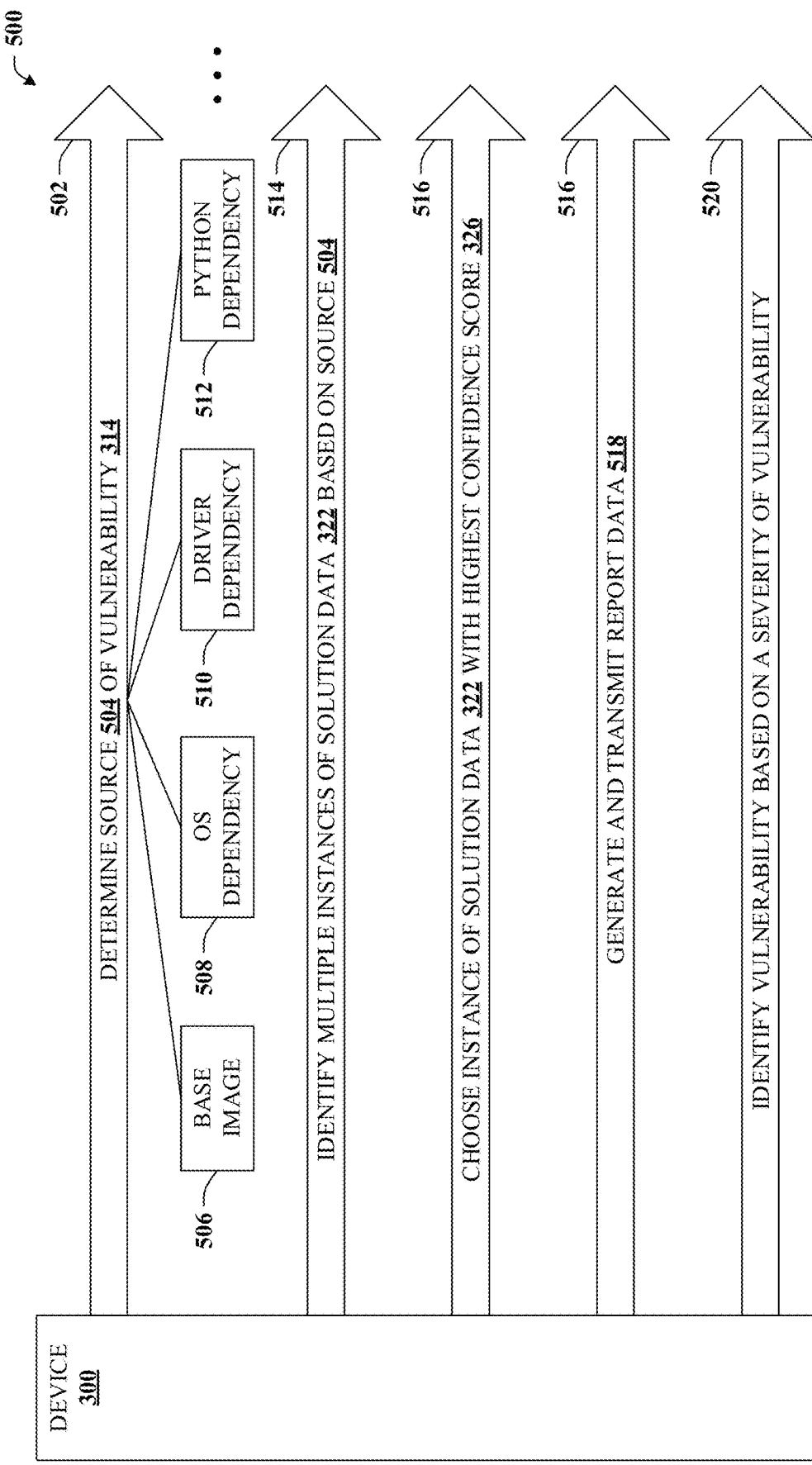
FIG. 5 is a schematic block diagram 500 illustrating additional aspects or elements of device 300 relating to container security in accordance with certain embodiments of this disclosure.

Turning now to FIG. 5, a schematic block diagram 500 is depicted illustrating additional aspects or elements of device 300 relating to container security in accordance with certain embodiments of this disclosure. As introduced in FIG. 3, device 300 can perform vulnerability mitigation procedure 318, which can, inter alia, identify solution data 322. FIG. 5 illustrates additional elements of vulnerability mitigation procedure 318 shown in greater detail, or other aspects of elements of device 300.

For example, in some embodiments, vulnerability mitigation procedure 318 can comprise determining the source 504 of the vulnerability 314. For instance, source 504 of the vulnerability 314 can be identified from among multiple sections of a containerized application 310. As illustrative examples, source 504 can arise from a first source indicative of vulnerability 314 being in base image 506, a second source indicative of the vulnerability 314 being in an operating system (OS) dependency 508, a third source indicative of vulnerability 314 being in a driver or driver dependency 510, a fourth source indicative of vulnerability 314 being in a Python dependency 512, or any other suitable section of containerized application 310.

It is understood that solution data 322 can differ depending on source 504 of vulnerability 314. For instance, solution data 322 in the case of vulnerability 314 having source 504 of an OS dependency 508 might be very different from solution data 322 for a vulnerability 314 having a source 504 of base image 506. Moreover, there might be several potential instances of solution data 322 for each one of the sources 502.

Hence, at reference numeral 514, device 300 can identify multiple instances of solution data 322. These multiple instances of solution data 322 can be based on source 504. At reference numeral 516, device 300 can choose the particular instance of solution data 322 with a highest confidence score 326. In other words, the multiple instances of solution data 322 can be determined as a function of the source 504 of vulnerability 314.

At reference numeral 516, device 300 can generate report data 518 that describes vulnerability 314. In some embodiments, report data 518 can comprise a first reference to vulnerability 314 and a second reference to solution data 322. For example, notifications comprising all or a portion of report data 518 can be sent out to customers or the like that explains various aspects of vulnerability 314. Such can lead to heightened awareness of security, which is a beneficial result. Report data 518 can include details relating to vulnerability 314 (e.g., a severity of vulnerability 314), descriptions or a link to descriptions of vulnerability 314 (e.g., the first reference), a package or a link to a package in which fixes available for a corresponding image and/or fixes from CVE data sore 330 or similar (e.g., the second reference).

Prior to, or subsequent to dispatching the notifications of report data 518, corresponding containerized application deployments running on enterprise clusters can be brought down, and labels can be added with timestamp details on when report data 518 was captured and what certain values were at that point in time. As illustrated at reference numeral 520, device 300 can identify vulnerability 314 based on a severity of vulnerability 314. Such can be based on an enterprise policy or a best practices policy, or any other suitable policy such as targeting critical or high risk vulnerabilities 314, while allowing low risk vulnerabilities 314 to remain, or reducing the total number of vulnerabilities 314 to be below a defined value or threshold. The policy might also be event-driven, changing due to external events such as resource utilization, security breaches or news, and so on.

Once suitable information relating to vulnerability 314 is captured, details from CVE data store 330 or another source can be mapped and parsed to obtain solution data 322. After applying solution data 322 to the associated container, values can be recomputed iteratively until the overall distribution is compliant with the policy or other security threshold. Upon passing this compliance test, the associated container can be brought back online and the relevant party(ies) notified. Additional detail relating to the aforementioned elements (e.g., reference numerals 502-520) are further detailed in connection with FIGS. 6 and 7.

Figure 6:
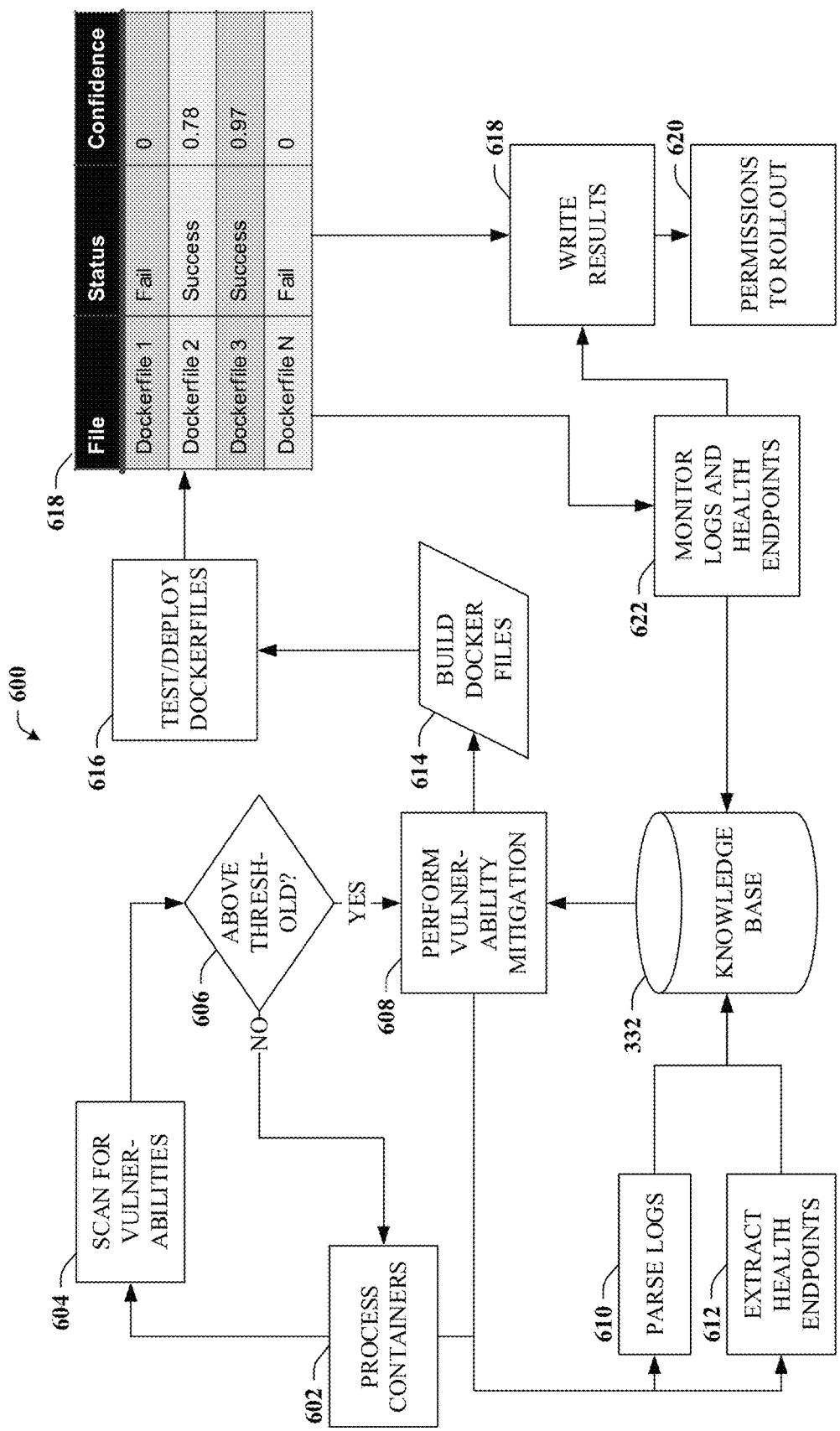
FIG. 6 depicts a flow diagram 600 illustrating an example of leveraging dockerfiles in the context of vulnerability mitigation in accordance with certain embodiments of this disclosure.

Referring now to FIG. 6, flow diagram 600 is depicted. Flow diagram 600 illustrates an example of leveraging dockerfiles in the context of vulnerability mitigation in accordance with certain embodiments of this disclosure. In some embodiments, flow diagram 600 can be implemented by device 300 or another suitable device.

At process block 602, containers and/or containerized applications can be processed. More specifically, at process block 604, individual containers and/or containerized applications can be scanned for vulnerabilities, which can be substantially similar to vulnerability 314. In response to detection of a vulnerability, decision block 606 can determine whether the vulnerability(ies) of the container is above a defined threshold. If not, the flow can return to process block 602 or process block 604. If so, the flow can continue to process block 608.

At process block 608, vulnerability mitigation can be performed, which can be substantially similar to vulnerability mitigation procedure 318 detailed in connection with FIG. 3 and subsequent figures. Either at the start of processing (e.g., 602) or in response to process block 608 or some other trigger or condition, process blocks 610 and 612 can be executed. Process block 610 specifically relates to parsing logs relating to the container and process block 612 specifically relates to extracting health endpoints for the container.

This information can be transmitted to knowledge base 332, which can be leveraged by process block 608 when performing vulnerability mitigation. The flow can continue to data block 614 where dockerfiles can be generated, typically based on a type or source of the vulnerability. Additional detail relating to such as well as to the vulnerability mitigation can be found in connection with FIG. 7.

The flow can continue to process block 616 where the dockerfiles can be tested and/or deployed, which can rely upon as well as add data to confidence score elements. Reference numeral 618 illustrates an example various dockerfiles, which can be representative of different solutions to the vulnerability. In some embodiments, these different solutions can represent at least a portion of solution data 322. In this example, dockerfiles 1 and N failed the test at process block 616 and have a zero confidence score. Alternatively, dockerfiles 2 and 3 succeeded, while dockerfile 3 has a much higher confidence score. Therefore, based on the discussions above, it is likely that dockerfile 3 and that associated solution will be selected for vulnerability mitigation.

Results of the test can be written at process block 618 and permissions to rollout can be verified at process block 620. Likewise, logs and health endpoints can be monitored at process block 622, which can be provided to knowledge base 332.

Figure 7:
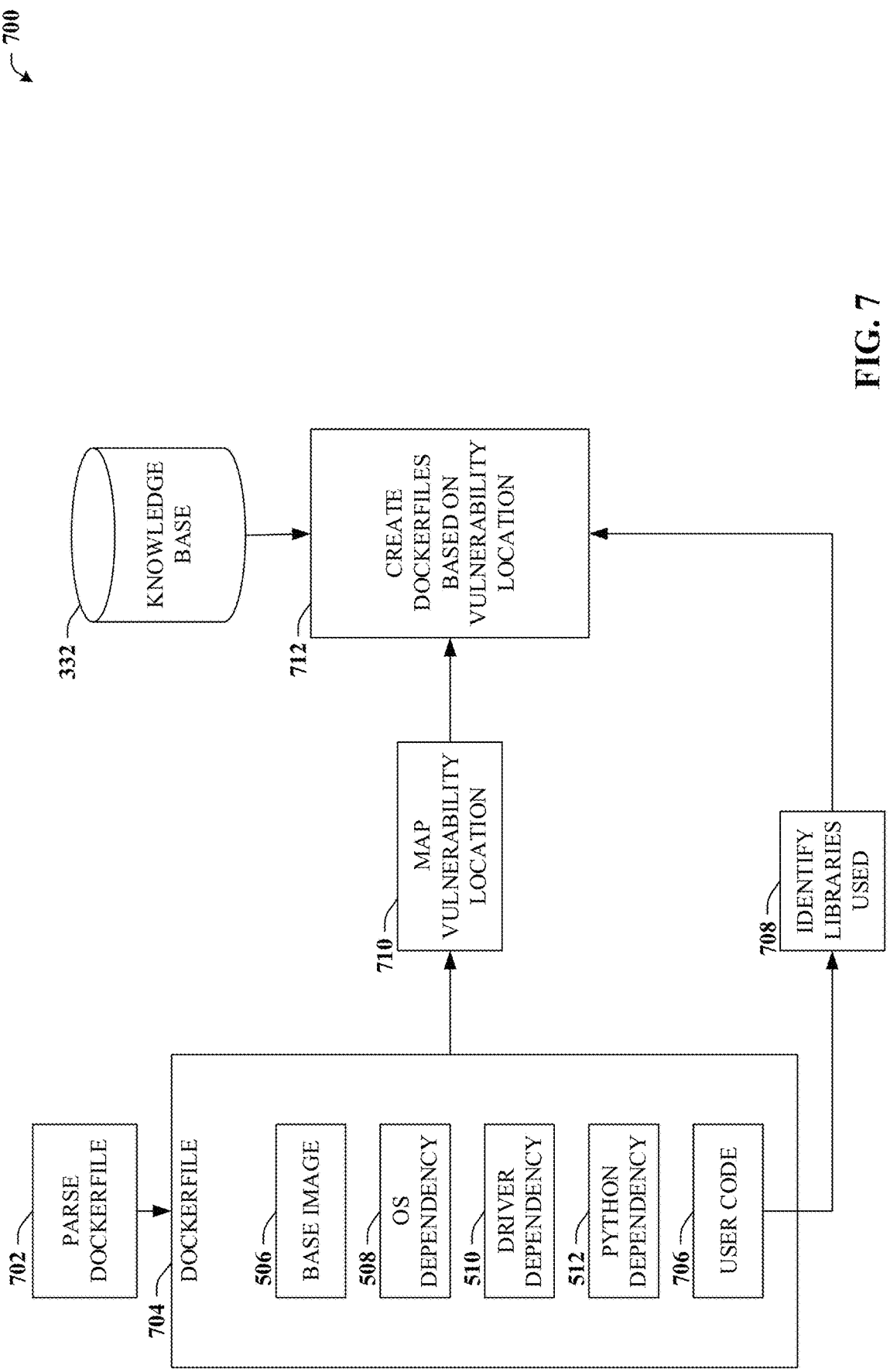
FIG. 7 depicts a flow diagram 700 illustrating elements or detail relating to generating solution data based on a source of the vulnerability in accordance with certain embodiments of this disclosure.

Referring now to FIG. 7, flow diagram 700 is depicted. Flow diagram 700 illustrates elements or detail relating to generating solution data based on a source of the vulnerability in accordance with certain embodiments of this disclosure. In some embodiments, flow diagram 700 can be implemented by device 300 or another suitable device.

At process block 702, a given dockerfile can be parsed. Reference numeral 704 illustrates an example dockerfile having multiple sections including, e.g., a base image 506 section, an OS dependency 508 section, a driver dependency 510 section, a Python dependency 512 section, and a user code 706 section. As illustrated, at process block 708, the libraries used by user code can be identified.

It is appreciated that, potentially, any one of the multiple section 506-706 can represent a source of the identified vulnerability. However, depending on the source of the vulnerability, different techniques can be implemented to mitigate the vulnerability. Hence, at process block 710, a location (e.g., a particular section of dockerfile 704) and/or source of the vulnerability can be mapped. It is understood that CVE data store 330 can be leveraged for this process.

Along with information leveraged from knowledge base 332 or another suitable source, at process block 712, dockerfiles can be created based on the vulnerability location mapped at process block 710. This flow step can be substantially similar to data block 614, but illustrated in more detail here to better describe how dockerfiles can be generated based on the vulnerability source. It is noted that process block 712 can generate several dockerfiles to be subsequently executed and checked.

For example, if the vulnerability is in base image 506 section, then recursion can be employed to run the described processes on base image 506. If the vulnerability is in the OS dependency 508 section, then several dockerfiles can be generated, potentially one for each possible solution. In this present case of the vulnerability being in the OS dependency 508 section, a first dockerfile can be generated that relates to an update and/or upgrade of the OS sources. A second dockerfile can be generated that relates to dependency removal if such is already in knowledge base 322. A third dockerfile can be generated that relates to attempting both of the previous two potential solutions, particularly if knowledge base 322 does not have sufficient data relating to one or the other such that the testing phase can provide more data in that regard.

If the vulnerability is in the drivers dependency 510 section, then a first dockerfile can be generated related to patching the associated drivers. Additionally or alternatively a second dockerfile can be generated related to removing the dependency if such has been successful, as recorded by knowledge base 322. In some cases a third dockerfile can be generated relating to attempting both of the previous two potential solutions, particularly if knowledge base 322 does not have sufficient data relating to one or the other such that the testing phase can provide more data in that regard.

If the vulnerability is in the Python dependency 512 section, then a first dockerfile can be generated related to updating or patching, provided Python dependency 512 is used in user code 706 section. If it is not so used in user code 706, then the Python dependency 512 can be removed in connection with a second dockerfile. In some instances, such as if process block 708 fails to identify libraries, then a third dockerfile can be generated relating to attempting both of the previous potential solutions.

EXAMPLE METHODS

Figure 8:
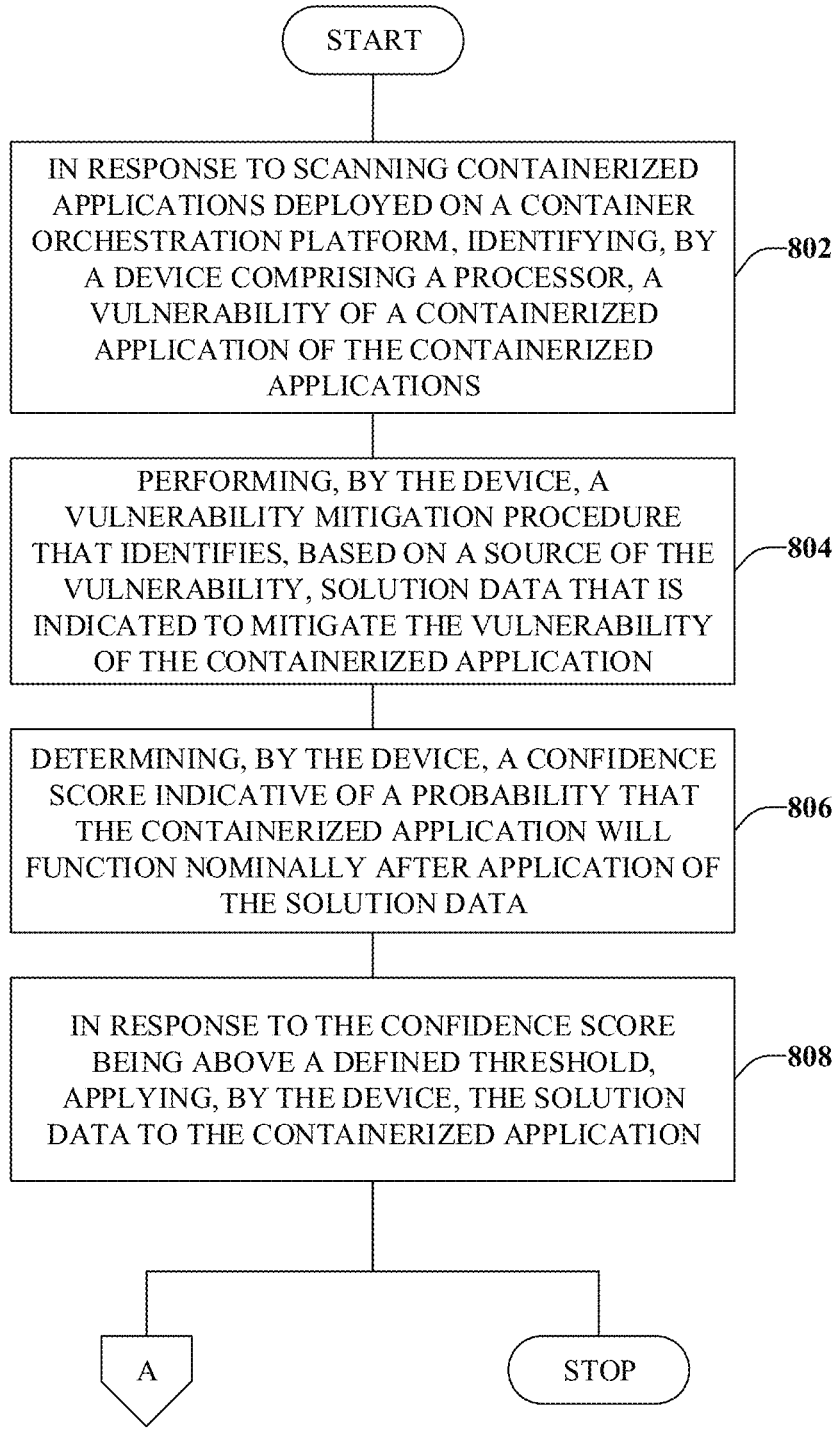
FIG. 8 illustrates an example method that can automate various elements of container security in accordance with certain embodiments of this disclosure.
Figure 9:
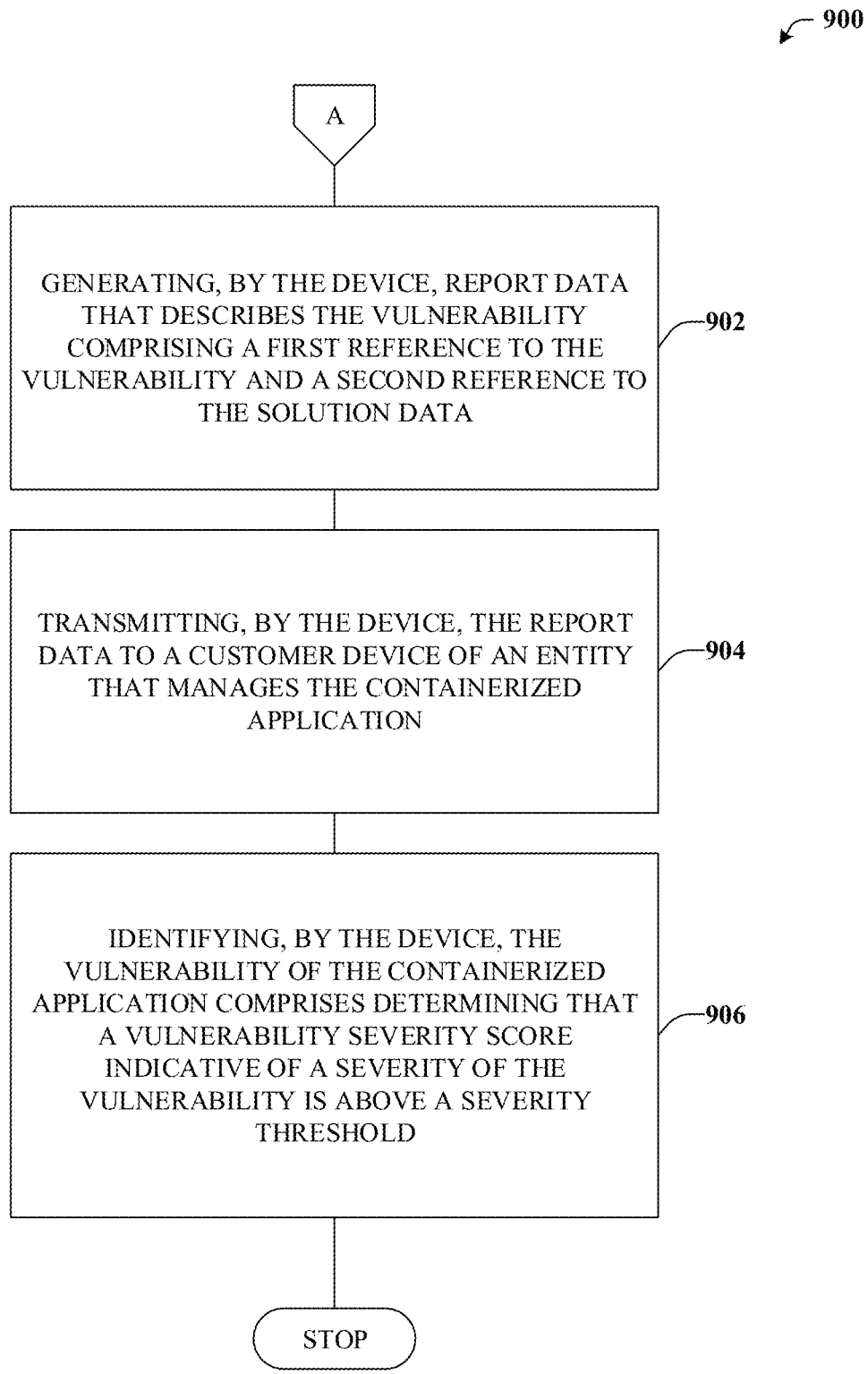
FIG. 9 illustrates an example method that can provide for additional aspect or elements in connection with the automating various elements of container security in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 8, exemplary method 800 is depicted. Method 800 can automate various elements of container security in accordance with certain embodiments of this disclosure. While method 800 describes a complete method, in some embodiments, method 800 can include one or more elements of method 900, as illustrated by insert A.

At reference numeral 802, a device comprising a processor can scan containerized applications deployed on a container orchestration platform. In response to the scanning, the device can identify a vulnerability of a containerized application of the containerized applications. In some embodiments, the vulnerability can be described in a common vulnerabilities and exposures (CVE) database or another suitable data store.

At reference numeral 804, the device can perform a vulnerability mitigation procedure. The vulnerability mitigation procedure can, inter alia, identify solution data that is indicated to mitigate the vulnerability of the containerized application. The vulnerability mitigation procedure can identify the solution data based on a source of the vulnerability, such as a portion or section of the containerized application from which the vulnerability arises. In some embodiments, a portion of the solution data can be described in the CVE database or another suitable data store.

At reference numeral 806, the device can determine a confidence score. The confidence score can be indicative of a probability that the containerized application will function nominally after application of the solution data. In response to the confidence score being above a defined threshold, the device can apply the solution data to the containerized application, as indicated at reference numeral 808. Method 800 can terminate or continue to insert A, which is further detailed in connection with FIG. 9.

Turning now to FIG. 9, exemplary method 900 is depicted. Method 900 can provide for additional aspect or elements in connection with the automating various elements of container security in accordance with certain embodiments of this disclosure.

At reference numeral 902, the device introduced at reference numeral 802 comprising a processor can generate report data. The report data can describe the vulnerability. In more detail, the report data can comprise a first reference to the vulnerability and a second reference to the solution data. The first reference and the second reference can relate to descriptions, reference links, or the like.

At reference numeral 904, the device can transmit the report data to a customer device of an entity that manages the containerized application. For example, the report data can be transmitted to a user or customer of the container orchestration platform service.

At reference numeral 906, the device can determine that a vulnerability severity score indicative of a severity of the vulnerability is above a severity threshold. This determination can be employed in connection with identifying the vulnerability of the containerized application discussed in connection with reference numeral 802 of FIG. 8. For example, in some embodiments, only those vulnerabilities with a sufficient severity need be identified and subsequent action take, which can be based on an enterprise policy or otherwise.

EXAMPLE OPERATING ENVIRONMENTS

Figure 10:
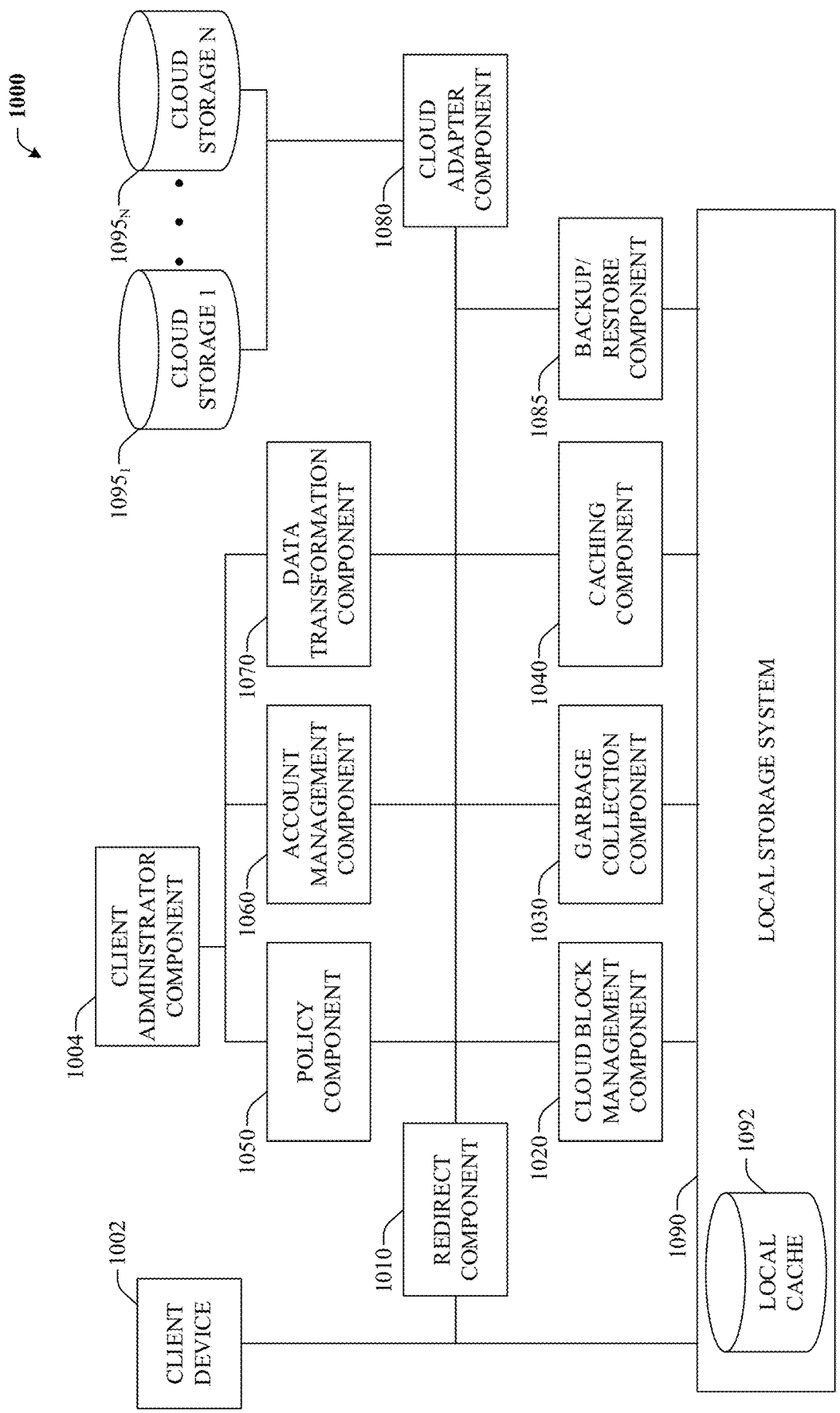
FIG. 10 illustrates a block diagram of an example distributed file storage system that employs tiered cloud storage in accordance with certain embodiments of this disclosure.
Figure 11:
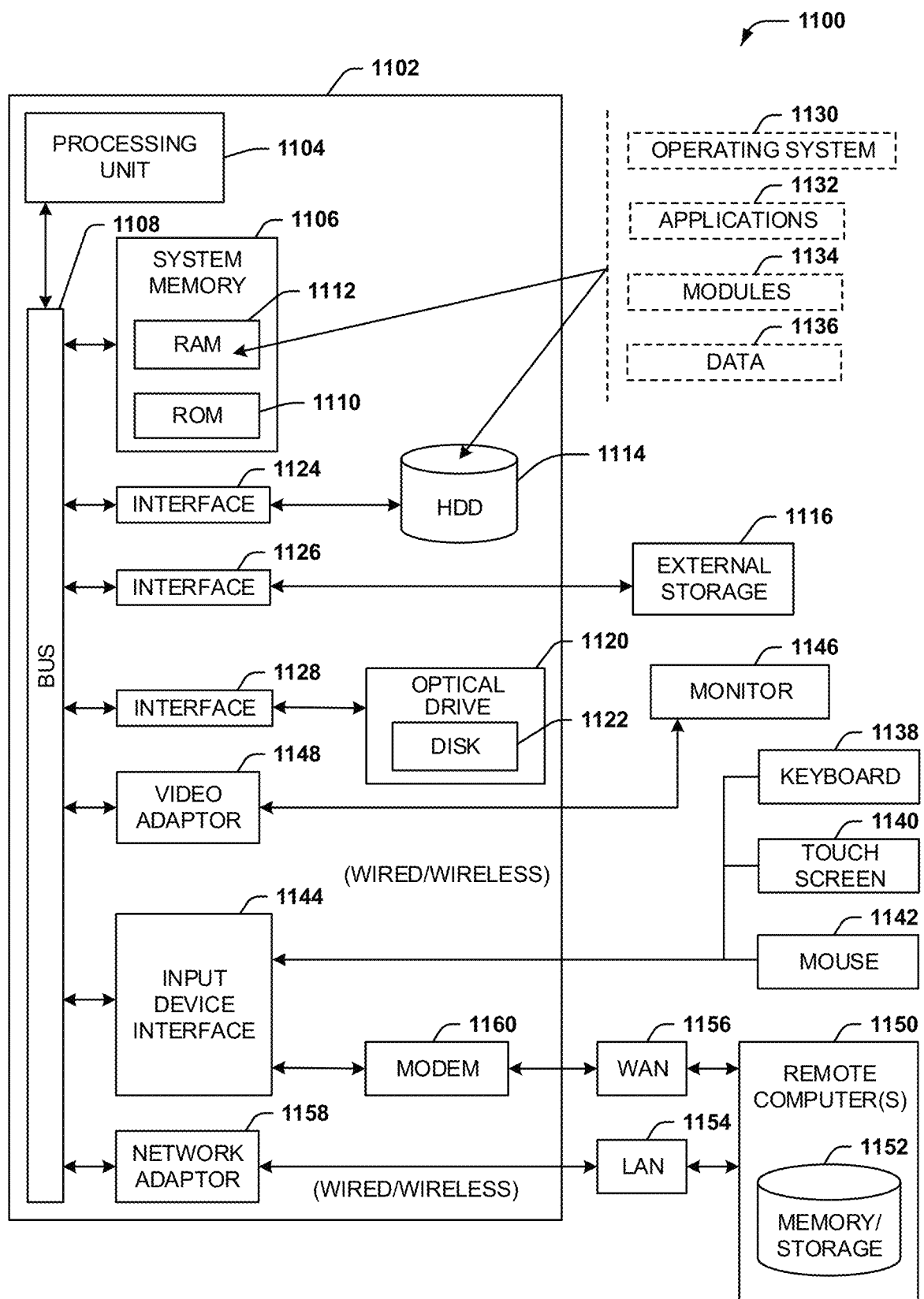
FIG. 11 illustrates an example block diagram of a computer operable to execute certain embodiments of this disclosure.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 $1095_1$ and cloud storage N $1095_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
 a processor; and
 a memory that stores executable instructions that, when executed by the processor, facilitate performance of operations, comprising:
 scanning containerized applications deployed on a container orchestration platform and identifying a vulnerability of a containerized application of the containerized applications;

performing a vulnerability mitigation procedure that identifies solution data based on a source of the vulnerability, where in the source represents a portion of the containerized application that exhibits the vulnerability, and wherein the solution data is indicated to mitigate the vulnerability of the containerized application and is determined in response to building a docker file that is constructed as a function of the source of the vulnerability;

determining a confidence score indicative of a likelihood that the containerized application to function nominally after application of the solution data that is selected as a function of the source of the vulnerability; and in response to the confidence score being above a defined threshold, applying the solution data to the containerized application.

2. The device of claim 1, wherein the solution data is at least one of:
update data that, when applied, updates the containerized application, patch data that, when applied, patches the containerized application, or vulnerability removal data that, when applied removes a dependency of the containerized application.

3. The device of claim 1, wherein the solution data is identified in response to comparing the vulnerability to a common vulnerabilities and exposures database.

4. The device of claim 1, wherein the confidence score is determined as a function of a history of success resulting from previously applying the solution data to other containerized applications.

5. The device of claim 1, wherein the vulnerability mitigation procedure further comprises determining, from among multiple sections of the containerized application, the source of the vulnerability.

6. The device of claim 1, wherein the source of the vulnerability is one of:
a first source indicative of the vulnerability being in a base image, a second source indicative of the vulnerability being in an operating system dependency, a third source indicative of the vulnerability being in a driver, or a fourth source indicative of the vulnerability being in a Python dependency.

7. The device of claim 1, wherein the vulnerability mitigation procedure identifies multiple instances of solution data and selects from among the multiple instances of solution data the solution data that is determined to have a highest respective confidence score.

8. The device of claim 1, wherein the multiple instances of solution data are determined as a function of the source of the vulnerability.

9. The device of claim 1, wherein the operations further comprise generating report data that describes the vulnerability.

10. The device of claim 9, wherein the report data comprises a first reference to the vulnerability and a second reference to the solution data.

11. The device of claim 9, wherein the operations further comprise transmitting the report data to a customer device of an entity that manages the containerized application.

12. The device of claim 1, wherein identifying the vulnerability of the containerized application comprises determining that a vulnerability severity score indicative of a severity of the vulnerability is above a severity threshold.

13. A non-transitory computer-readable medium comprising instructions that, in response to execution, cause a system comprising a processor to perform operations, comprising:
in response to parsing containerized applications deployed on a container orchestration platform, identify a vulnerability of a containerized application of the containerized applications and a source of the vulnerability, wherein the source represents a portion of the containerized application that exhibits the vulnerability;

perform a vulnerability mitigation procedure that identifies solution data as a function of the source of the vulnerability, wherein the solution data mitigates the vulnerability and is generated in response to building a docker file constructed as a function of the source of the vulnerability;

determine a confidence score indicative of a likelihood that the containerized application functions nominally after application of the solution data, wherein the solution data is determined based on the source of the vulnerability; and in response to the confidence score being above a defined threshold, apply the solution data to the containerized application.

14. The non-transitory computer-readable medium of claim 13, wherein
the solution data is identified in response to comparing the vulnerability to a common vulnerabilities and exposures database.

15. The non-transitory computer-readable medium of claim 13, wherein the confidence score is determined as a function of a history of success resulting from previously applying the solution data to other containerized applications.

16. The non-transitory computer-readable medium of claim 13, wherein the vulnerability mitigation procedure further comprises determining, from among multiple sections of the containerized application, the source of the vulnerability.

17. A method, comprising:
in response to scanning containerized applications deployed on a container orchestration platform, identifying, by a device comprising a processor, a vulnerability of a containerized application of the containerized applications, and identifying a source of the vulnerability, wherein the source represents a portion of the containerized application that exhibits the vulnerability;

performing, by the device, a vulnerability mitigation procedure that identifies, based on the source of the vulnerability, solution data that is indicated to mitigate the vulnerability of the containerized application, wherein the solution data is determined in response to building a docker file constructed as a function of the source of the vulnerability;

determining, by the device, a confidence score that is indicative of a probability that the containerized application functions nominally after application of the solution data that is selected as a function of the source of the vulnerability; and in response to the confidence score being above a defined threshold, applying, by the device, the solution data to the containerized application.

18. The method of claim 17, further comprising generating, by the device, report data that describes the vulnerability comprising a first reference to the vulnerability and a second reference to the solution data.

19. The method of claim 17, further comprising transmitting, by the device, the report data to a customer device of an entity that manages the containerized application.

20. The method of claim 17, further comprising identifying, by the device, the vulnerability of the containerized application comprises determining that a vulnerability severity score indicative of a severity of the vulnerability is above a severity threshold.

* * * * *